United States Patent
Li et al.

(10) Patent No.: US 10,684,497 B2
(45) Date of Patent: Jun. 16, 2020

(54) ELECTRO-OPTIC MODULATOR

(71) Applicant: Huawei Technologies Co., Ltd., Shenzhen, Guangdong, P.R. (CN)

(72) Inventors: Yanbo Li, Dongguan (CN); Xiaolu Song, Dongguan (CN); Zhen Dong, Dongguan (CN); Ruiqiang Ji, Dongguan (CN); Shengmeng Fu, Wuhan (CN); Li Zeng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/252,450

(22) Filed: Jan. 18, 2019

(65) Prior Publication Data

US 2019/0171044 A1    Jun. 6, 2019

Related U.S. Application Data

(63) Continuation of application No. PCT/CN2016/090890, filed on Jul. 21, 2016.

(51) Int. Cl.
*G02F 1/025* (2006.01)
*G02F 1/015* (2006.01)

(52) U.S. Cl.
CPC .............. *G02F 1/025* (2013.01); *G02F 1/015* (2013.01); *G02F 2001/0151* (2013.01)

(58) Field of Classification Search
None
See application file for complete search history.

(56) References Cited

U.S. PATENT DOCUMENTS

| | | | |
|---|---|---|---|
| 2003/0190107 A1 | 10/2003 | Walker | |
| 2004/0016920 A1* | 1/2004 | Akiyama | G02F 1/2257 257/14 |
| 2006/0198581 A1 | 9/2006 | Belmonte et al. | |
| 2008/0170821 A1 | 7/2008 | Kissa et al. | |

(Continued)

FOREIGN PATENT DOCUMENTS

| | | |
|---|---|---|
| CN | 1434929 A | 8/2003 |
| CN | 101221294 A | 7/2008 |

(Continued)

*Primary Examiner* — Jerry Rahll
(74) *Attorney, Agent, or Firm* — Kilpatrick Townsend & Stockton LLP

(57) ABSTRACT

An electro-optic modulator includes an input waveguide, a beam splitter connected to the input waveguide, a modulation arm that is disposed on each branch of the beam splitter and modulates a signal. Each modulation arm is correspondingly disposed with a first layer electrode and a second layer electrode. The first layer electrode is a high-frequency traveling wave electrode and is configured to change carrier concentration in the modulation arm, the second layer electrode is a direct current electrode having an inductor function, and an inductor formed in the second layer electrode is connected to the first layer electrode. The electro-optic modulator has functions of a bias tee, so that integration of the electro-optic modulator can be improved without affecting its performance. High-density packaging layout difficulty and cabling pressure can be effectively reduced, and cabling and packaging of a multi-channel high-speed signal on a base board can be implemented.

11 Claims, 2 Drawing Sheets

(56) References Cited

U.S. PATENT DOCUMENTS

| | | |
|---|---|---|
| 2009/0324156 A1 | 12/2009 | Kinpara et al. |
| 2012/0120472 A1 | 5/2012 | Uesugi et al. |
| 2012/0328227 A1 | 12/2012 | Hara et al. |
| 2016/0062155 A1 | 3/2016 | Ichikawa et al. |
| 2018/0180965 A1 | 6/2018 | Goi |

FOREIGN PATENT DOCUMENTS

| | | |
|---|---|---|
| CN | 101512416 A | 8/2009 |
| CN | 102466898 A | 5/2012 |
| CN | 102841478 A | 12/2012 |
| CN | 105044931 A | 11/2015 |
| CN | 105074547 A | 11/2015 |
| CN | 206759461 U | 12/2017 |
| JP | H11237593 A | 8/1999 |

* cited by examiner

ELECTRO-OPTIC MODULATOR

CROSS-REFERENCE TO RELATED APPLICATIONS

This application is a continuation of International Application No. PCT/CN2016/090890 filed on Jul. 21, 2016. The disclosure of the aforementioned application is hereby incorporated by reference in its entirety.

TECHNICAL FIELD

The present application relates to the field of communications technologies, and in particular, to an electro-optic modulator.

BACKGROUND

In recent years, a silicon photonics technology has been widely studied in the industry and academia, and various functional components are successively developed, and include a low-loss silicon waveguide, a beam splitter/combiner, an electro-optic modulator, a filter, a wavelength division multiplexer/demultiplexer, a photoelectric detector, and the like. Compared with other photonics integration technologies, the silicon photonics technology includes the following advantages: A silicon waveguide has a large refractive index difference, so that a size of the waveguide can be reduced to a submicron level, and waveguide bend at a micrometer level can be implemented. Therefore, the silicon photonics technology can implement integration of higher-density components. A silicon-waveguide-based optical component may be fully processed by using a mature CMOS technique, and generated in batches at low costs. Monolithic integration may be performed on a silicon-waveguide-based optical component and a microelectronic circuit, so that a more complex system can be created, and a more complex function can be completed.

With development of low power consumption, high density, and a high capacity in an optical communication and optical interconnection technology, a silicon-based modulator with low drive pressure, high integration, and a high modulation rate is a key enabling technology. An O/E co-package solution of a high-density multi-channel integrated electro-optic modulator is also required in a future application scenario such as an optical backplane and a high-capacity cluster, and the like. An integrated multi-channel electro-optic modulator is a key enabling technology for O/E co-package. In a silicon-based photonics integration technology, an optical component and a photonic chip with a complex function can be manufactured in batches at low costs by using a mature silicon technique. Therefore, a silicon-based electro-optic modulator that is on the basis of a silicon technique has potential to implement high-density multi-channel integration. However, the high-density multi-channel integration needs to be compatible with a high-density packaging layout, to implement high-speed electro-packaging of a high-density multi-channel modulator. There is no mature solution in the industry. In addition, the high-density multi-channel modulator and a high-speed high-density electro-packaging technology and solution are also required by future multi-channel high-capacity high-density optical modules such as CFP8 and CFP16.

SUMMARY

The present disclosure provides an electro-optic modulator, to further improve integration of the electro-optic modulator, and effectively reduce high-density packaging layout difficulty and cabling pressure.

The present disclosure provides an electro-optic modulator, and the electro-optic modulator includes an input waveguide, a beam splitter connected to the input waveguide, a modulation arm that is disposed on each branch of the beam splitter and that is configured to modulate a signal, a beam combiner that is connected to each branch of the beam splitter and that is configured to combine signals, and an output waveguide connected to the beam combiner. Each modulation arm is correspondingly disposed with a double-layer electrode, a first layer electrode of the double-layer electrode is a high-frequency traveling wave electrode that is configured to change carrier concentration in the modulation arm, a second layer electrode is a direct current electrode having an inductor function, and there is an inductor connected to the high-frequency traveling wave electrode in an inductor formed in the second layer electrode.

In the implementation solution, there are two modulation arms that are symmetrically disposed. Each modulation arm is disposed with a double-layer electrode, a first layer electrode of the double-layer electrode uses a high-frequency traveling wave electrode, and a second layer electrode uses a direct current electrode that can form an inductor. In this way, the electro-optic modulator has some functions of a bias tee, integration of the electro-optic modulator is improved, and an external connection structure of the electro-optic modulator is reduced, so that the integration of the electro-optic modulator can be further improved without affecting performance of the electro-optic modulator, high-density packaging layout difficulty and cabling pressure can be effectively reduced, and cabling and packaging of a multi-channel high-speed signal on a base board can be implemented.

In an optional solution, a capacitor that is disposed on a side of the input waveguide and that is corresponding to each modulation arm is further included. The electro-optic modulator has a modulator high-frequency signal input end, one end of the capacitor is connected to the modulator high-frequency signal input end of the electro-optic modulator, the other end of the capacitor is connected to the high-frequency traveling wave electrode, and the capacitor and the inductor in the second layer electrode are both connected to the high-frequency traveling wave electrode, to form a bias tee. In this solution, the bias tee is disposed in the electro-optic modulator, to further improve the integration of the electro-optic modulator, reduce the high-density packaging layout difficulty and the cabling pressure, and implement cabling and packaging of a multi-channel high-speed signal on a base board.

In a specific disposition, the electro-optic modulator has a silicon substrate, a buried silicon dioxide layer disposed on the silicon substrate, and a modulator active-area silicon waveguide and a silicon dioxide isolating layer that are disposed on the buried silicon dioxide layer, where the second layer electrode is disposed on a side that is of the silicon dioxide isolating layer and that is opposite to the buried silicon dioxide layer, the first layer electrode is buried in the silicon dioxide isolating layer, the first layer electrode and the second layer electrode are electrically connected, an electrode of the capacitor is disposed on the side that is of the silicon dioxide isolating layer and that is opposite to the buried silicon dioxide layer, and the other electrode is buried in the silicon dioxide isolating layer.

When the first layer electrode and the second layer electrode are specifically electrically connected, the silicon dioxide isolating layer is disposed with a via hole, and the first layer electrode and the second layer electrode are connected by using metal filling the via hole. Therefore, it helps set a connection between the two layers of electrodes.

In addition, a thermal electrode loaded onto each branch of the beam combiner is further included, to further improve the performance of the electro-optic modulator, and improve the integration of the electro-optic modulator.

In a specific embodiment, the second layer electrode includes a modulator inductor corresponding to each modulation arm, one end of each modulator inductor is connected to a modulator direct-current signal input end, and the other end is connected to the high-frequency traveling wave electrode, to further improve the performance of the electro-optic modulator, and improve the integration of the electro-optic modulator.

In a specific embodiment, the second layer electrode further includes a driver inductor corresponding to each modulation arm, one end of each driver inductor is connected to a driver direct-current signal input end, and the other end is connected to the modulator high-frequency signal input end of the electro-optic modulator, to further improve the performance of the electro-optic modulator, and improve the integration of the electro-optic modulator.

REFERENCE NUMERALS

11: input waveguide,
12: beam splitter,
13: beam combiner,
14: output waveguide,
21: first layer electrode,
22: driver inductor,
23: modulator inductor,
24: capacitor,
25: thermal electrode,
26: second layer electrode,
31: modulator direct-current signal input end,
32: driver direct-current signal input end,
33: modulator high-frequency signal input end,
50: silicon substrate,
60: buried silicon dioxide layer,
70: silicon dioxide isolating layer, and
80: modulator active-area silicon waveguide.

DETAILED DESCRIPTION

To make the objectives, technical solutions, and advantages of the present disclosure clearer, the following further describes the present disclosure in detail with reference to the accompanying drawings. Apparently, the described embodiments are merely some rather than all of the embodiments of the present disclosure. All other embodiments obtained by persons of ordinary skill in the art based on the embodiments of the present disclosure without creative efforts shall fall within the protection scope of the present disclosure.

Figure 1:
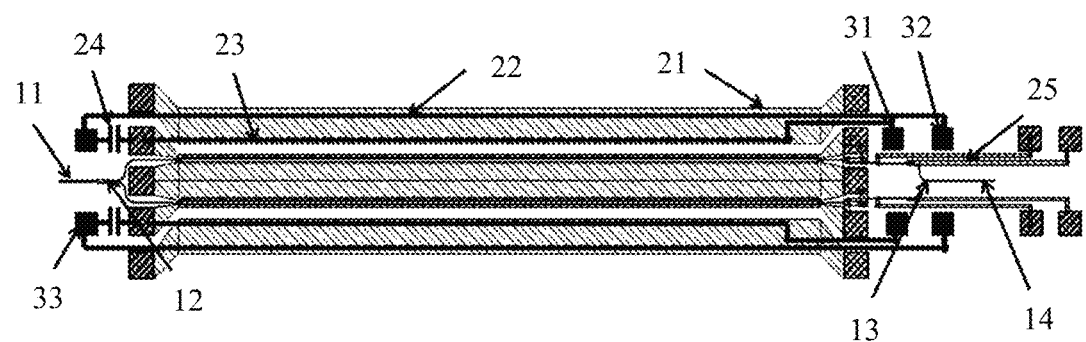
FIG. 1 is a top view of an electro-optic modulator according to Embodiment 1 of the present disclosure.
Figure 2:
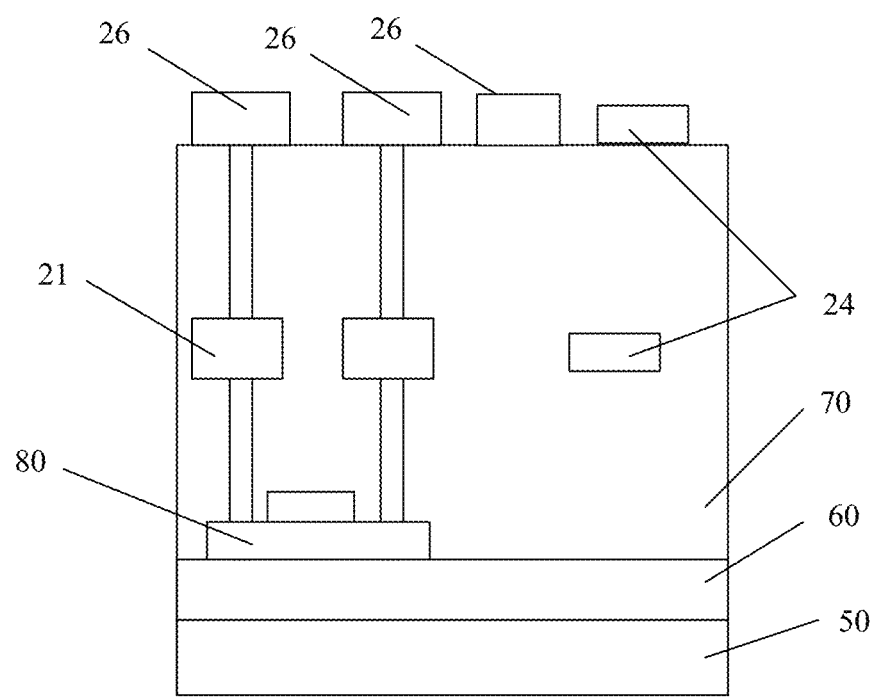
FIG. 2 is a schematic diagram of distribution of section layers of an electro-optic modulator according to Embodiment 1 of the present disclosure.

FIG. 1 is a top view of an electro-optic modulator according to Embodiment 1 of the present disclosure. FIG. 2 is a schematic diagram of distribution of section layers of an electro-optic modulator according to Embodiment 1 of the present disclosure.

The electro-optic modulator provided in this embodiment includes an input waveguide 11, a beam splitter 12 connected to the input waveguide 11, and a modulation arm that is disposed on each branch of the beam splitter 12 and that is configured to modulate a signal. Referring to FIG. 1, in a specific disposition, there are two branches that are symmetrically disposed. To be specific, two modulation arms are symmetrically disposed. In addition, the electro-optic modulator further includes a beam combiner 13 that is connected to each branch of the beam splitter 12 and that is configured to combine signals and an output waveguide 14 connected to the beam combiner 13. During specific use, consecutive input optical signals enter the input waveguide 11 and are divided by the beam splitter 12 into two beams of light that have equal power, and the two beams of optical signals separately pass through the modulation arms and then are combined by the beam combiner 13 and finally output by the output waveguide 14.

Each modulation arm is correspondingly disposed with a double-layer electrode, a first layer electrode 21 of the double-layer electrode is a high-frequency traveling wave electrode (the "high-frequency traveling wave electrode" below is a first layer electrode 21) that is configured to change carrier concentration in the modulation arm, a second layer electrode 26 is a direct current electrode having an inductor function, and there is an inductor connected to the high-frequency traveling wave electrode in an inductor formed in the second layer electrode 26.

During modulation, a to-be-modulated electrical signal is loaded onto the modulation arm by using the high-frequency traveling wave electrode. Carrier concentration in a modulation area waveguide of the modulation arm is changed, so that an effective refractive index of a modulation area waveguide is changed, and a phase difference between two beams of optical signals is dynamically changed to form modulation. The second layer electrode 26 is used as a direct current electrode, to implement the inductor function by using a threadlike metal cable design of the direct current electrode. In this way, the electro-optic modulator has some functions of a bias tee, integration of the electro-optic modulator is improved, and an external connection structure of the electro-optic modulator is reduced, so that the integration of the electro-optic modulator can be further improved without affecting performance of the electro-optic modulator, high-density packaging layout difficulty and cabling pressure can be effectively reduced, and cabling and packaging of a multi-channel high-speed signal on a base board can be implemented.

In addition, two layers of electrode metal are further disposed at a modulator signal input end, to implement a function of a capacitor 24 by using an overlapping design. The capacitor 24 is disposed on a side of the input waveguide 11, the electro-optic modulator has a modulator high-frequency signal input end 33, one end of the capacitor 24 is connected to the modulator high-frequency signal input end 33 of the electro-optic modulator, the other end of the capacitor 24 is connected to the high-frequency traveling wave electrode, and the capacitor 24 and the inductor in the second layer electrode 26 are both connected to the high-frequency traveling wave electrode, to form a bias tee and load a high-frequency radio frequency signal and a direct current signal.

In a specific disposition, there may be a plurality of second layer electrodes 26. For example, the second layer electrode 26 includes a driver inductor 22 and a modulator inductor 23. It can be learned from FIG. 1 that the second layer electrode 26 of the electro-optic modulator provided in this embodiment includes a modulator inductor 23 corresponding to each modulation arm, one end of each modulator inductor 23 is connected to a modulator direct-current signal input end 31, and the other end is connected to the high-frequency traveling wave electrode. A direct current bias signal is input from the modulator direct-current signal input end 31 and is loaded onto the modulation arm by using the modulator inductor 23, to implement reverse biasing of a PN junction of the modulation arm. A to-be-modulated radio frequency electrical signal is input from the modulator high-frequency signal input end 33 and is loaded onto the modulation arm by using the capacitor 24. The carrier concentration in the modulation area waveguide is changed, so that an effective refractive index of the modulation area waveguide is changed, and a phase difference between two beams of optical signals is dynamically changed to form modulation. In addition, the electro-optic modulator further includes a thermal electrode 25 loaded onto each branch of the beam combiner 13. A direct current signal is loaded onto the thermal electrode 25, to change the effective refractive index of the waveguide area by using a thermo-optic effect, and control a phase bias point of the modulator. In addition, the second layer electrode 26 further includes a driver inductor 22 corresponding to each modulation arm. One end of each driver inductor 22 is connected to a driver direct-current signal input end 32, and the other end of each driver inductor 22 is connected to the modulator high-frequency signal input end 33 of the electro-optic modulator. When the driver inductor 22 is integrated, a direct current bias signal is input from the driver direct-current signal input end 32, passes through the driver inductor 22, and may be loaded onto a driver that provides a high-frequency radio frequency signal for the modulator, to provide a direct current voltage for the driver.

FIG. 2 is a schematic diagram of distribution of section layers of an electro-optic modulator according to Embodiment 1 of the present disclosure. It can be learned from FIG. 2 that the electro-optic modulator provided in this embodiment has a silicon substrate 50, a buried silicon dioxide layer 60 disposed on the silicon substrate, and a modulator active-area silicon waveguide 80 and a silicon dioxide isolating layer 70 that are disposed on the buried silicon dioxide layer 60.

The second layer electrode 26 is disposed on a side that is of the silicon dioxide isolating layer 70 and that is opposite to the buried silicon dioxide layer 60, the first layer electrode 21 is buried in the silicon dioxide isolating layer 70, and the first layer electrode 21 and the second layer electrode 26 are electrically connected. In a specific connection, the silicon dioxide isolating layer 70 is disposed with a via hole, and the first layer electrode 21 and the second layer electrode 26 are connected by using metal filling the via hole. Specifically, the first layer electrode 21 is connected to the modulator active-area silicon waveguide 80 by using the metal filling the via hole, and then connected to the second layer electrode 26 by using the metal in the via hole.

An electrode of the capacitor 24 is disposed on the side that is of the silicon dioxide isolating layer 70 and that is opposite to the buried silicon dioxide layer 60, and the other electrode is buried in the silicon dioxide isolating layer 70.

It can be learned from the foregoing description that the electro-optic modulator uses a double-layer electrode structure, and implements functions of a high frequency electrode and the bias tee. In a specific implementation, first layer metal (the first layer electrode) of the electrode structure implements the high-frequency traveling wave electrode, and second layer metal (the second layer electrode) of the electrode structure implements the direct current electrode, to implement the inductor function by using the threadlike metal cable design of the direct current electrode. The two layers of electrode metal are disposed at the modulator signal input end, to implement the function of the capacitor 24 by using the overlapping design. The inductor and the capacitor 24 formed in the electrode structure are both connected to a radio frequency electrode of the modulator, to form a bias tee structure and load a high-frequency radio frequency signal and a direct current signal. In comparison with the prior art, high-density multi-channel integration of the modulator can be implemented in the present disclosure, can be compatible with a high-density packaging layout, and can implement high-speed high-density electro-packaging of a high-density multi-channel modulator. In the present disclosure, a bias tee is integrated in a modulator structure, so that the integration of the electro-optic modulator can be further improved without affecting performance of the electro-optic modulator, high-density packaging layout difficulty and cabling pressure can be effectively reduced, and cabling and packaging of a multi-channel high-speed signal on a base board can be implemented.

Figure 3:
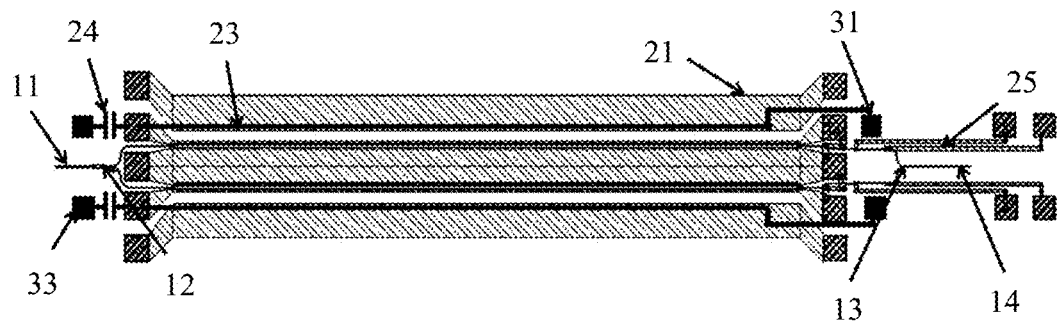
FIG. 3 is a top view of an electro-optic modulator according to Embodiment 2 of the present disclosure.

FIG. 3 is a schematic structural diagram of an electro-optic modulator according to Embodiment 2 of the present disclosure. In this embodiment, a second layer electrode includes only a modulator inductor 23. In a specific implementation, first layer metal of an electrode structure implements a high-frequency traveling wave electrode, and second layer metal of the electrode structure implements a direct current electrode, to implement an inductor function by using a threadlike metal cable design of the direct current electrode. Two layers of electrode metal at a modulator signal input end implement a function of a capacitor 24 by using an overlapping design. An inductor and the capacitor 24 formed in the electrode structure are both connected to a radio frequency electrode of the modulator, to form a bias tee structure and load a high-frequency radio frequency signal and a direct current signal. The modulator inductor 23 is connected to the radio frequency electrode, to provide a direct current voltage for the modulator. The integrated capacitor 24 is connected to both the modulator inductor 23 and a radio frequency input pad, to provide a radio frequency signal voltage for the modulator. Other analyses are similar, and details are not described herein again.

Figure 4:
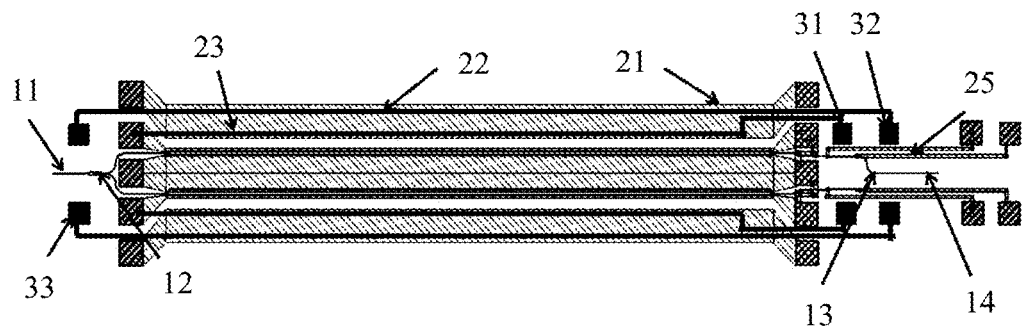
FIG. 4 is a top view of an electro-optic modulator according to Embodiment 3 of the present disclosure.

FIG. 4 is a schematic structural diagram of an electro-optic modulator according to Embodiment 3 of the present disclosure. As shown in FIG. 4, when Embodiment 3 is compared with Embodiment 1, a difference lies in that a second layer electrode in a double-layer electrode structure of the modulator includes a modulator inductor 23 and a driver inductor 22, and a capacitor 24 is omitted.

In a specific implementation, first layer metal of the electrode structure implements a high-frequency traveling wave electrode, and second layer metal of the electrode structure implements a direct current electrode, to implement an inductor function by using a threadlike metal cable design of the direct current electrode. The modulator inductor 23 is connected to a radio frequency electrode, to provide a direct current voltage for the modulator. The driver inductor 22 provides a direct current voltage for a driver. Other analyses are similar, and details are not described herein again.

Figure 5:
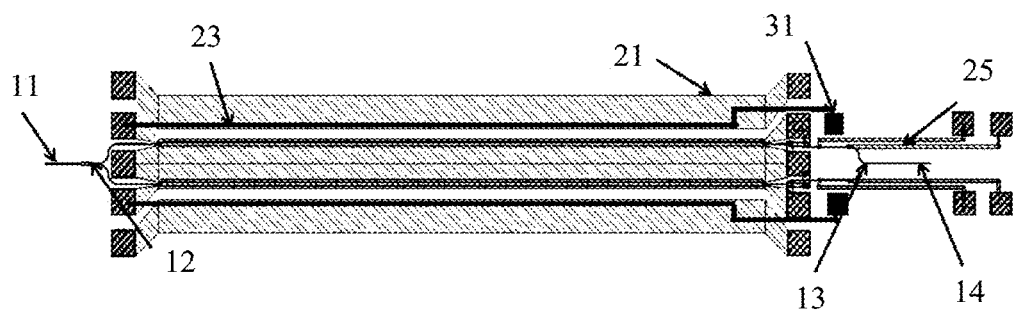
FIG. 5 is a top view of an electro-optic modulator according to Embodiment 4 of the present disclosure.

FIG. 5 is a schematic structural diagram of an electro-optic modulator according to Embodiment 4 of the present disclosure. As shown in FIG. 5, when Embodiment 4 is compared with Embodiment 1, a difference lies in that a second layer electrode in a double-layer electrode structure of the modulator includes only a modulator inductor 23, and a capacitor 24 and a driver inductor 22 are omitted.

In a specific implementation, first layer metal of the electrode structure implements a high-frequency traveling wave electrode, and second layer metal of the electrode structure implements a direct current electrode, to implement an inductor function by using a threadlike metal cable design of the direct current electrode. The modulator inductor 23 is connected to a radio frequency electrode, to provide a direct current voltage for the modulator. Other analyses are similar, and details are not described herein again.

It can be learned from the foregoing specific embodiments that the electro-optic modulator provided in the present disclosure uses a double-layer electrode structure, and a partial structure of a bias tee is integrated into the electro-optic modulator, or a double-layer electrode structure is set to form an inductor and a capacitor 24, to integrate an entire bias tee into the electro-optic modulator. In comparison with the prior art, high-density multi-channel integration of the modulator can be implemented in the present disclosure, can be compatible with a high-density packaging layout, and can implement high-speed high-density electro-packaging of a high-density multi-channel modulator. In the present disclosure, a bias tee is integrated in a modulator structure, so that integration of the electro-optic modulator can be further improved without affecting performance of the electro-optic modulator, high-density packaging layout difficulty and cabling pressure can be effectively reduced, and cabling and packaging of a multi-channel high-speed signal on a base board can be implemented. A technique of a double-layer electrode structure integrating the inductor and the capacitor 24 is compatible with a standard silicon photonics manufacturing technique, and the structure is compact and is extremely applicable to a high-density multi-channel high-capacity application scenario.

Obviously, persons skilled in the art can make various modifications and variations to the present disclosure without departing from the spirit and scope of the present disclosure. The present disclosure is intended to cover these modifications and variations provided that they fall within the protection scope defined by the following claims and their equivalent technologies.

What is claimed is:

1. An electro-optic modulator, comprising:
an input waveguide;
a beam splitter connected to the input waveguide;
a modulation arm disposed on each branch of the beam splitter and configured to modulate a signal;
a beam combiner connected to each branch of the beam splitter and configured to combine signals; and
an output waveguide connected to the beam combiner, wherein each modulation arm is correspondingly disposed with a different double-layer electrode comprising,
a first layer electrode that is high-frequency traveling wave electrode configured to change carrier concentration in the modulation arm, and
a second layer electrode that is a direct current electrode having an inductor function and comprises an inductor connected to the first layer electrode.

2. The electro-optic modulator according to claim 1, further comprising:
a capacitor disposed on a side of the input waveguide, the capacitor corresponding to each modulation arm; and, wherein
the electro-optic modulator has a modulator high-frequency signal input end, one end of the capacitor is connected to the modulator high-frequency signal input end, another end of the capacitor is connected to the high-frequency traveling wave electrode, and the capacitor and the inductor in the second layer electrode are both connected to the high-frequency traveling wave electrode and form a bias tee.

3. The electro-optic modulator according to claim 2, further comprises:
a silicon substrate;
a buried silicon dioxide layer disposed on the silicon substrate;
a modulator active-area silicon waveguide and a silicon dioxide isolating layer that are disposed on the buried silicon dioxide layer; and, wherein
the second layer electrode is disposed on a side of the silicon dioxide isolating layer that is opposite to the buried silicon dioxide layer, the first layer electrode is buried in the silicon dioxide isolating layer, the first layer electrode and the second layer electrode are electrically connected, an electrode of the capacitor is disposed on the side of the silicon dioxide isolating layer that is opposite to the buried silicon dioxide layer, and another electrode of the capacitor is buried in the silicon dioxide isolating layer.

4. The electro-optic modulator according to claim 3, wherein the silicon dioxide isolating layer is disposed with a via hole, and the first layer electrode and the second layer electrode are connected by using metal filling the via hole.

5. The electro-optic modulator according to claim 1, further comprising:
a thermal electrode loaded onto each branch of the beam combiner.

6. The electro-optic modulator according to claim 2, wherein the second layer electrode comprises:
a modulator inductor corresponding to each modulation arm, and wherein one end of each modulator inductor is connected to a modulator direct-current signal input end and another end is connected to the high-frequency traveling wave electrode.

7. The electro-optic modulator according to claim 6, wherein the second layer electrode further comprises:
a driver inductor corresponding to each modulation arm, and wherein one end of each driver inductor is connected to a driver direct-current signal input end and another end is connected to the modulator high-frequency signal input end of the electro-optic modulator.

8. The electro-optic modulator according to claim 3, wherein the second layer electrode comprises:
a modulator inductor corresponding to each modulation arm, and wherein one end of each modulator inductor is connected to a modulator direct-current signal input end and another end is connected to the high-frequency traveling wave electrode.

9. The electro-optic modulator according to claim 8, wherein the second layer electrode further comprises:
   a driver inductor corresponding to each modulation arm, and wherein one end of each driver inductor is connected to a driver direct-current signal input end and another end is connected to the modulator high-frequency signal input end of the electro-optic modulator.

10. The electro-optic modulator according to claim 4, wherein the second layer electrode comprises:
   a modulator inductor corresponding to each modulation arm, and wherein one end of each modulator inductor is connected to a modulator direct-current signal input end and another end is connected to the high-frequency traveling wave electrode.

11. The electro-optic modulator according to claim 10, wherein the second layer electrode further comprises:
   a driver inductor corresponding to each modulation arm, and wherein one end of each driver inductor is connected to a driver direct-current signal input end and another end is connected to the modulator high-frequency signal input end of the electro-optic modulator.

\* \* \* \* \*